(12) United States Patent
Dajaku

(10) Patent No.: US 11,735,964 B2
(45) Date of Patent: Aug. 22, 2023

(54) ELECTRICAL MACHINE AND METHOD OF OPERATING THE ELECTRICAL MACHINE

(71) Applicant: FEAAM GmbH, Neubiberg (DE)

(72) Inventor: Gurakuq Dajaku, Neubiberg (DE)

(73) Assignee: FEAAM GMBH, Neubiberg (DE)

( * ) Notice: Subject to any disclaimer, the term of this patent is extended or adjusted under 35 U.S.C. 154(b) by 0 days.

(21) Appl. No.: 17/180,641

(22) Filed: Feb. 19, 2021

(65) Prior Publication Data

US 2021/0265883 A1 Aug. 26, 2021

(30) Foreign Application Priority Data

Feb. 21, 2020 (DE) .................. 102020104659.6

(51) Int. Cl.
*H02K 1/27* (2022.01)
*H02K 1/276* (2022.01)
*H02K 21/14* (2006.01)

(52) U.S. Cl.
CPC ........... *H02K 1/2773* (2013.01); *H02K 21/14* (2013.01)

(58) Field of Classification Search
CPC ...... H02K 1/2773; H02K 1/272; H02K 1/276; H02K 1/2766; H02K 1/278; H02K 21/14; H02K 1/274; H02K 1/2706; H02K 1/27; H02K 1/2753; H02K 2213/03

See application file for complete search history.

(56) References Cited

U.S. PATENT DOCUMENTS

2019/0199148 A1* 6/2019 Hattori ................. H02K 1/04

FOREIGN PATENT DOCUMENTS

| CN | 206992831 U | | 2/2018 | |
|---|---|---|---|---|
| CN | 110212665 A | * | 9/2019 | ............ H02K 1/276 |
| DE | 102018127127 A1 | | 4/2020 | |
| EP | 0558746 A1 | | 9/1993 | |

OTHER PUBLICATIONS

Machine Translation of CN 110212665 A (Year: 2019).*

* cited by examiner

*Primary Examiner* — Thomas Truong
(74) *Attorney, Agent, or Firm* — Morgan, Lewis & Bockius LLP

(57) ABSTRACT

An electrical machine (20) comprising a stator (21) and a rotor (22) rotatably supported relative to the stator (21) is disclosed. The rotor (22) comprises two first recesses (23) and at least one second recess (24), wherein an air gap (25) is arranged between the stator (21) and the rotor (22), the two first recesses (23) are arranged in the rotor (22) and extend completely through the rotor (22) from the air gap (25) to a shaft (26) on which the rotor (22) is arranged, the two first recesses (23) are arranged in a manner displaced relative to one another by less than 180° along the circumference of the rotor (22), the at least one second recess (24) is arranged in a manner displaced relative to the first recesses (23) by at least 90° along the circumference of the rotor (22), the at least one second recess (24) does not extend through the rotor (22) to the shaft (26), and a first permanent magnet (27) is arranged each in the first recesses (23) and/or a second permanent magnet (28) is arranged each in the at least one second recess (24). In addition, a method of operating the electrical machine (20) is provided.

14 Claims, 4 Drawing Sheets

ELECTRICAL MACHINE AND METHOD OF OPERATING THE ELECTRICAL MACHINE

The present application relates to an electrical machine and a method of operating the electrical machine.

Typically, electrical machines comprise a stator and a rotor movable relative thereto. Electrical machines can operate as a motor or as a generator, whereby electrical energy is converted into kinetic energy or vice versa. In operation, a rotor magnetic field interacts with a magnetic field of the stator.

To generate a rotor magnetic field, the rotor may have permanent magnets. The use of permanent magnets has the advantage that there are many different ways to arrange the permanent magnets in the rotor, which is why there are several ways to optimize the efficiency of the electrical machine.

However, the permanent magnets usually account for a large portion of the total costs of the electrical machine.

One object to be achieved is to specify an electrical machine which can be operated efficiently. Another object to be achieved is to specify an efficient method of operating the electrical machine.

The object is achieved by the subject-matter of the independent patent claim. Advantageous embodiments and further improvements are specified in the subclaims.

According to at least one embodiment of the electrical machine, the electrical machine comprises a stator and a rotor rotatably mounted with respect to the stator. The stator may comprise a stator winding. For this purpose, the stator may have slots in which the stator winding is arranged. The stator winding can be connected to power electronics and be designed to generate a rotating field. The rotor may be an internal rotor or an external rotor. If the rotor is an internal rotor, an outer surface of the rotor is facing the stator. The rotor may be arranged on a shaft. In addition, the rotor has an axis of rotation.

The rotor includes two first recesses. The first recesses may be cavities in the rotor. The rotor may include a rotor core which includes a core material. The two first recesses are free of any core material. The core material may be iron. The first recesses may extend completely through the rotor along the axis of rotation of the rotor. The rotor may have exactly two first recesses.

The rotor further comprises at least one second recess. The second recess may be a cavity in the rotor. The second recess is free of any core material of the rotor. The second recess may extend completely through the rotor along the axis of rotation of the rotor. The rotor may have exactly one second recess. Alternatively, the rotor may have exactly two second recesses.

An air gap is arranged between the stator and the rotor. The air gap may extend between the stator and the rotor in a direction extending in parallel to the axis of rotation of the rotor.

The two first recesses are arranged in the rotor and extend completely through the rotor from the air gap to a shaft on which the rotor is arranged. This means that the first recesses are at least partially surrounded by the rotor. The first recesses may be surrounded at least partially by the material of the rotor. The first recesses are each adjacent to the air gap. From the air gap, the first recesses each extend along a radial direction in a cross-section through the rotor to the shaft. The cross-section through the rotor extends in a plane that is perpendicular to the axis of rotation of the rotor. The first recesses are directly adjacent to the shaft. The first recesses may have a straight shape. This means that the first recesses may extend along a straight line from the air gap to the shaft.

The two first recesses are arranged in a manner displaced relative to one another by less than 180° along the circumference of the rotor. This means that the two first recesses are arranged in a manner displaced relative to one another by less than 180° along the circumference of the rotor in a cross-section through the rotor. Thus, the main directions of extension of the first recesses include an angle of less than 180° between them in a cross-section through the rotor.

The at least one second recess is arranged in a manner displaced relative to the first recesses by at least 90° along the circumference of the rotor This means that the at least one second recess is arranged in a cross-section through the rotor in a manner displaced by at least 90° along the circumference of the rotor relative to the first recesses. Thus, the at least one second recess is arranged in a manner spaced apart from the first recesses. Thus, the position at which the second recess is arranged, is arranged in a manner displaced from the positions of the first recesses along the circumference of the rotor by at least 90°.

The at least one second recess does not extend through the rotor to the shaft. This means that the second recess extends partially through the rotor, but not all the way to the shaft. The second recess may be arranged entirely within the rotor. This means that, in a cross-section through the rotor, the second recess may be surrounded by the rotor on all sides. The second recess may have a different geometric shape than the first recesses.

A first permanent magnet is arranged each in the first recesses and/or a second permanent magnet is arranged in the at least one second recess. The first permanent magnets may have the same size and the same shape. The second permanent magnet may have a different size or a different shape than the first permanent magnets. The first permanent magnets each do not completely fill the first recesses. The second permanent magnet does not completely fill the second recess. The first permanent magnets and the second permanent magnet each have a magnetic axis. The magnetic axis extends in parallel to the direction of magnetization of the respective magnets. This means that the magnetic axis connects the two poles of each permanent magnet.

Thus, there are three different possibilities of designing the rotor: a first permanent magnet is arranged each in the first recesses and the second recess is free of a permanent magnet, a second permanent magnet is arranged in the second recess and the first recesses are free of permanent magnets, or a first permanent magnet is arranged each in the first recesses and a second permanent magnet is arranged in the second recess.

For a rotor, in which a first permanent magnet is arranged each in the first recesses and a second permanent magnet is arranged in the second recess, the rotor magnetic field excited by the permanent magnets has four poles. The properties of the rotor magnetic field depend, among other things, on the geometric extension of the permanent magnets in the rotor and the arrangement of non-magnetic material in the rotor. Therefore, the rotor magnetic field has four poles, even if the number of permanent magnets in the rotor is less than four. Thus, the number of permanent magnets in the rotor can be less than the number of poles of the rotor magnetic field.

This has the advantage that the number of permanent magnets required can thus be reduced. Normally, permanent magnets contribute to the costs of the rotor significantly. In the case of the rotor described here, less than four permanent magnets are required for a rotor magnetic field having four poles. The costs of the rotor can be reduced substantially by reducing the number of permanent magnets required or by reducing the size of the permanent magnets of the rotor.

Furthermore, with the electrical machine described herein, it is possible to use a component of the magnetomotive force of the rotor of an order greater than 1 for torque generation. The magnetomotive force of the rotor may have components of different harmonic orders. Another expression of the magnetomotive force is the field excitation curve. For example, if the component of the magnetomotive force of the rotor of the order of 3 has a non-zero magnetic flux density, said component can be used for torque generation. The design of the rotor described herein is optimized for operation of the electrical machine using a component of the magnetomotive force of an order greater than 1 for torque generation. As a result, the electrical machine can be operated efficiently.

According to at least one embodiment of the electrical machine, the rotor magnetic field excited by the first and the at least one second permanent magnets have four poles. This means that the rotor magnetic field has two pairs of poles. Thus, the rotor with only three permanent magnets has a rotor magnetic field with four poles. As a result, the number of permanent magnets required can be kept low and the manufacturing costs of the electrical machine can be reduced.

According to at least one embodiment of the electrical machine, the magnetic axes of the first permanent magnets point in opposite directions along the circumference of the rotor. This means that the magnetic axes of the first permanent magnets point away from one another along the circumference of the rotor. In a cross-section through the rotor, the magnetic axes of the first permanent magnets may point in opposite directions along the circumference of the rotor. In a cross-section through the rotor, the magnetic axes of the first permanent magnets may include an angle greater than 180° between them. Advantageously, in this arrangement, a component or components of the magnetomotive force of the rotor that is used to generate torque can be amplified and components or a component of the magnetomotive force that is not used to generate torque can be suppressed. As a result, the electrical machine can be operated efficiently.

According to at least one embodiment of the electrical machine, the magnetic axes of the first permanent magnets each extend perpendicularly to a radial direction in a cross-section through the rotor. The radial directions extend in a cross-section through the rotor from the shaft toward the air gap. The magnetic axes of the first permanent magnets extend perpendicularly to the respective radial direction extending through the respective first permanent magnet. Thus, advantageously a component or components of the magnetomotive force of the rotor that is used to generate torque can be amplified, and components or a component of the magnetomotive force that is not used to generate torque can be suppressed. Thus, the electrical machine can be operated efficiently.

According to at least one embodiment of the electrical machine, an electrically insulating material or a gas is arranged at least in some places in the first recesses. The electrically insulating material is non-magnetic. The electrically insulating material or the gas each may completely fill the first recesses. Alternatively, the electrically insulating material or the gas may fill the area of the first recesses, in which no first permanent magnet is arranged. Thus, a first permanent magnet and the electrically insulating material or the gas each may completely fill a first recess. In this regard, the electrically insulating material or the gas may be arranged adjacent to the air gap as well as adjacent to the shaft. Thus, the first permanent magnet in the first recess may be surrounded by the electrically insulating material or the gas on two sides. The gas may be air. In those areas where the electrically insulating material or the gas is arranged, the resistance for the magnetic flux density is increased in comparison to the surrounding rotor material. Arranging the electrically insulating material or the gas adjacent to the air gap and adjacent to the shaft allows for as few closed field lines as possible to be present in the rotor. This means that losses in the rotor are minimized. Thus, the electrical machine can be operated efficiently.

According to at least one embodiment of the electrical machine, the first recesses are each larger than the first permanent magnet arranged therein. This can mean that the first recesses each have a larger geometric extension than the first permanent magnet arranged therein. In particular, the first recesses are each larger in a cross-section through the rotor than the first permanent magnet arranged therein. This allows for an electrically insulating material or a gas to be arranged together with a first permanent magnet in a respective first recess. This allows for an efficient operation of the electrical machine.

According to at least one embodiment of the electrical machine, the at least one second recess is larger than the second permanent magnet. This may mean that the second recess has a larger geometric extension than the second permanent magnet arranged therein. In particular, the second recess is larger in a cross-section through the rotor than the second permanent magnet arranged therein. For example, the second recess extends farther along the circumference of the rotor than the second permanent magnet. This allows for an electrically insulating material or a gas to be arranged together with the second permanent magnet in the second recess. This allows for an efficient operation of the electrical machine.

According to at least one embodiment of the electrical machine, an electrically insulating material or a gas is arranged at least in some places in the at least one second recess. The electrically insulating material is non-magnetic. The electrically insulating material or the gas may completely fill the second recess. Alternatively, the electrically insulating material or the gas may fill the area of the second recess in which no second permanent magnet is arranged. Thus, a second permanent magnet and the electrically insulating material or the gas may completely fill the second recess. In this regard, the electrically insulating material or the gas may be arranged along the circumference of the rotor at both ends of the second permanent magnet. This means that the second recess can extend farther along the circumference of the rotor than the second permanent magnet arranged therein. The second permanent magnet may be centered within the second recess. The electrically insulating material or the gas may be arranged in the peripheral regions of the second recess that are not filled by the second permanent magnet. Thus, the second permanent magnet can be surrounded by the electrically insulating material or the gas on two sides. The second recess may be directly adjacent to the air gap. The gas may be air. Thus, air from the air gap can be arranged in the peripheral regions of the second recess. Arranging the electrically insulating material or the gas in the areas of the second recess which are not filled by the second permanent magnet allows for as few closed field lines as possible to be present in the rotor. This means that losses in the rotor are minimized. Thus, the electrical machine can be operated efficiently.

According to at least one embodiment of the electrical machine, the at least one second permanent magnet has a curved shape. The second permanent magnet may extend in some places along the circumference of the rotor. Thus, the second permanent magnet may have the shape of a segment of a circle. This shape of the second permanent magnet allows for the rotor, which likewise comprises two first permanent magnets, to have a magnetic field with four poles. Overall, the required number of permanent magnets and the manufacturing costs of the electrical machine can thus be reduced.

According to at least one embodiment of the electrical machine, the at least one second recess is directly adjacent to the air gap. The second recess may extend directly from the air gap and into the rotor. The second recess may extend in a cross-section through the rotor in the radial directions from the air gap toward the shaft. In this respect, the second recess extends only partially and not through the rotor to the shaft. This allows for any easy fabrication of the second recess and an easy insertion of the second permanent magnet into the second recess.

According to at least one embodiment of the electrical machine, the at least one second recess extends along a portion of the circumference of the rotor. This means that the second recess has the shape of a segment of a circle. This allows for the second permanent magnet to also have the shape of a segment of a circle. Overall, thus the required number of permanent magnets and the manufacturing costs of the electrical machine can be reduced.

According to at least one embodiment of the electrical machine, the at least one second recess has a main direction of extension which is perpendicular to a radial direction in a cross-section through the rotor. The second recess may have a main direction of extension in a cross-section through the rotor, which direction is perpendicular to a radial direction in a cross-section through the rotor. In this respect, the radial direction may extend through the center of the second recess. The second recess extends farther along its main direction of extension in a cross-section through the rotor than in other directions. The second recess may be arranged entirely within the rotor. This means that the second recess is not adjacent to the air gap. This shape of the second recess allows for a second permanent magnet to be arranged in the second recess, which has a rectangular shape in the cross-section. Thus, the second permanent magnet can be manufactured in a simple and economical manner.

According to at least one embodiment of the electrical machine, the electrical machine comprises two second recesses arranged entirely within the rotor. A second permanent magnet may be arranged in each of the second recesses. The second recesses are not adjacent to the air gap. The second recesses are not connected to one another. This means that the second recesses are spaced apart from one another in the rotor. The second recesses may have a substantially rectangular shape in a cross-section through the rotor. This allows for the second permanent magnets to each have a rectangular shape in a cross-section through the rotor. Thus, the second permanent magnets can be manufactured in a simple and economical manner.

Furthermore, a method of operating the electrical machine described herein is disclosed. Thus, all features of the electrical machine described herein are also disclosed for the method of operating the electrical machine and vice versa.

According to at least one embodiment of the method of operating the electrical machine, a component of the magnetomotive force of the rotor of an order greater than 1 is used for torque generation. This means that the component of the magnetomotive force of the rotor of the order 1, which is referred to as the fundamental wave, is not used for torque generation. Instead, a higher harmonic of the magnetomotive force of the rotor is used for torque generation. This means that in operation of the electrical machine a component of the magnetomotive force of the rotor of an order greater than 1 interacts with the magnetic field of the stator for torque generation. For this purpose, the permanent magnets can be arranged in the rotor in such a way that the flux density is maximized for the component of the magnetomotive force of the rotor which is used for torque generation. Advantageously, the flux density of components of the magnetomotive force of the rotor that are not used for torque generation can also be minimized. Both of the above is achieved by arrangement of the first recesses and the at least one second recess described herein. This allows for an efficient operation of the electrical machine.

Below, the electrical machine and the method of operating the electrical machine described herein will be explained in more detail in connection with embodiments and the accompanying figures.

Figure 1:
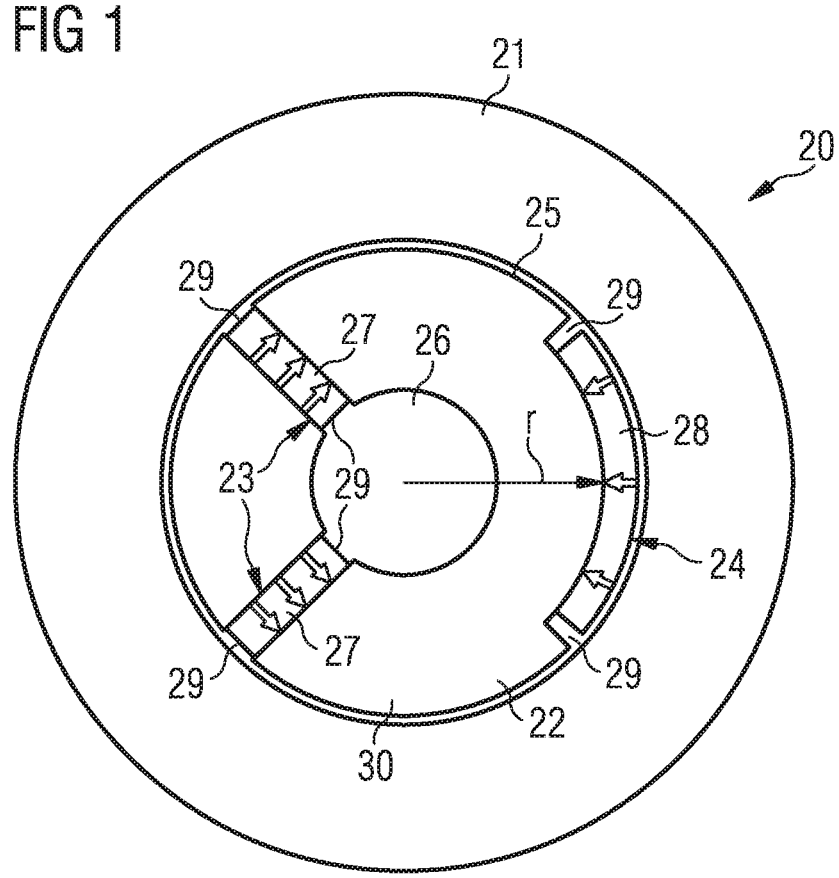
FIG. 1 shows a schematic cross-section through an electrical machine according to an embodiment.

FIG. 1 shows a schematic cross-section through an electrical machine 20 according to an embodiment. The electrical machine 20 comprises a stator 21 and a rotor 22 rotatably mounted with respect to the stator 21. The rotor 22 is an internal rotor which is arranged in the stator 21. That is, in the cross-section shown, the stator 21 surrounds the rotor 22 completely. An air gap 25 is arranged between the stator 21 and the rotor 22.

The rotor 22 includes two first recesses 23. The two first recesses 23 are arranged in the rotor 22 and extend completely through the rotor 22 from the air gap 25 to a shaft 26 on which the rotor 22 is arranged. The rotor 22 comprises a rotor core 30. The first recesses 23 extend completely through the rotor core 30 in the cross-section shown through the rotor 22. Each of the first recesses 23 extends along a radial direction r through the rotor 22. Each radial direction r extends from the center of the rotor 22 toward the air gap 25. The two first recesses 23 extend along two different radial directions r through the rotor 22. This means that one of the first recesses 23 extends along a radial direction r that is different from a radial direction r along which the other of the first recesses 23 extends.

The two first recesses 23 are arranged in a manner displaced from one another by less than 180° along the circumference of the rotor 22. In particular, the first recesses 23 are arranged in a manner displaced relative to one another by less than 120° along the circumference of the rotor 22.

A first permanent magnet 27 is arranged each in the first recesses 23. The first recesses 23 are each larger than the first permanent magnet 27 arranged therein. This means that the first permanent magnets 27 do not completely fill the first recesses 23 each. In addition to the first permanent magnets 27, an electrically insulating material 29 is arranged each in the first recesses 23. In this case, the electrically insulating material 29 is air. Air is arranged in each of the first recesses 23 between the first permanent magnet 27 and the air gap 25. Furthermore, air is arranged in each of the first recesses 23 between the first permanent magnet 27 and the shaft 26.

The first permanent magnets 27 each have a rectangular shape in the cross-section through the rotor 22. The magnetic axes of the first permanent magnets 27 point in opposite directions along the circumference of the rotor 22. In this case, this means that the magnetic axes of the first permanent magnets 27 include an angle of approximately 90° relative to one another. The magnetic axes of the first permanent magnets 27 each extend perpendicularly to a radial direction r in a cross-section through the rotor 22.

The rotor 22 further includes a second recess 24. The second recess 24 is arranged along the circumference of the rotor 22 in a manner displaced relative to the first recesses 23 by at least 90°. In this case, the second recess 24 is arranged along the circumference of the rotor 22 in a manner displaced relative to the first recesses 23 by more than 90°. This means that each area of the second recess 24 is arranged along the circumference of the rotor 22 in a manner displaced relative to the two first recesses 23 by more than 90°. In the cross-section through the rotor 22, the rotor 22 may be divided into two halves, the two first recesses 23 being arranged in one of the halves and the second recess 24 being arranged in the other half.

The second recess 24 does not extend through the rotor 22 all the way to the shaft 26. The second recess 24 extends from the air gap 25 toward the shaft 26. Thus, the second recess 24 is directly adjacent to the air gap 25. Furthermore, the second recess 24 extends along a portion of the circumference of the rotor 22. This means that the second recess 24 has a curved shape. Furthermore, the second recess 24 has the shape of a segment of a circle.

A second permanent magnet 28 is arranged in the second recess 24. The second recess 24 is larger than the second permanent magnet 28. Thus, the second permanent magnet 28 does not completely fill the second recess 24. In addition to the second permanent magnet 28, an electrically insulating material 29 is arranged in some places in the second recess 24. In this case, the electrically insulating material 29 is air. Just like the second recess 24, the second permanent magnet 28 has a curved shape and extends along a portion of the circumference of the rotor 22. The second recess 24 extends farther along the circumference of the rotor 22 than the second permanent magnet 28. The electrically insulating material 29 is arranged in the areas where the second recess 24 extends farther than the second permanent magnet 28 along the circumference of the rotor 22. The second permanent magnet 28 is centered in the second recess 24, so that the electrically insulating material 29, i.e. air from the air gap 25, is arranged on two sides of the second permanent magnet 28.

The magnetic axis of the second permanent magnet 28 points from the air gap 25 toward the shaft 26. That is to say, for each position along the second permanent magnet 28, the magnetic axis extends in parallel to the radial direction r at the respective position. Thus, the magnetic axis of the second permanent magnet 28 points to the center of the rotor 22.

The rotor magnetic field excited by the first permanent magnets 27 and by the second permanent magnet 28 has four poles. The electrical machine 20 shown in FIG. 1 comprises exactly two first permanent magnets 27 and exactly one second permanent magnet 28.

The electrical machine 20 shown in FIG. 1 can be operated by a method in which a component of the magnetomotive force of the rotor 22 of an order greater than 1 is used for torque generation.

Figure 2:
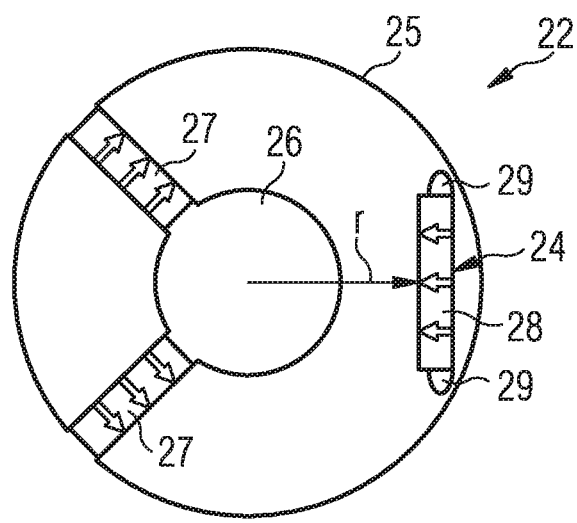
FIG. 2 shows a schematic cross-section through a rotor according to an embodiment.

FIG. 2 is a cross-section through a rotor 22 according to an embodiment. The rotor 22 of FIG. 2 may be used in the electrical machine 20 shown in FIG. 1 instead of the rotor 22 shown in FIG. 1. The rotor 22 shown in FIG. 2 differs from the rotor 22 shown in FIG. 1 in terms of shape and arrangement of the second recess 24 and the second permanent magnet 28. The second recess 24 has a main direction of extension which is perpendicular to a radial direction r in a cross-section through the rotor 22. The main direction of extension of the second recess 24 is perpendicular to the radial direction r which passes through the center of the second recess 24. The second recess 24 is arranged entirely within the rotor 22. This means that in the cross-section through the rotor 22, the second recess 24 is surrounded by the material of the rotor 22 on all sides.

The second permanent magnet 28 in the second recess 24 has a rectangular shape in the cross-section through the rotor 22. The magnetic axis of the second permanent magnet 28 points from the air gap 25 toward the shaft 26. Thus, the magnetic axis of the second permanent magnet 28 extends in parallel to the radial direction r which passes through the center of the second permanent magnet 28. This means that the magnetic axis of the second permanent magnet 28 extends, at each position of the second permanent magnet 28, in parallel to the radial direction r which passes through the center of the second permanent magnet 28.

The electrically insulating material 29 is arranged at the respective shorter lateral edges of the second permanent magnet 28. The second recess 24 in the area of the electrically insulating material 29 may be of any shape.

The rotor magnetic field excited by the first permanent magnets 27 and by the second permanent magnet 28 has four poles. The rotor 22 shown in FIG. 2 comprises exactly two first permanent magnets 27 and exactly one second permanent magnet 28.

Figure 3:
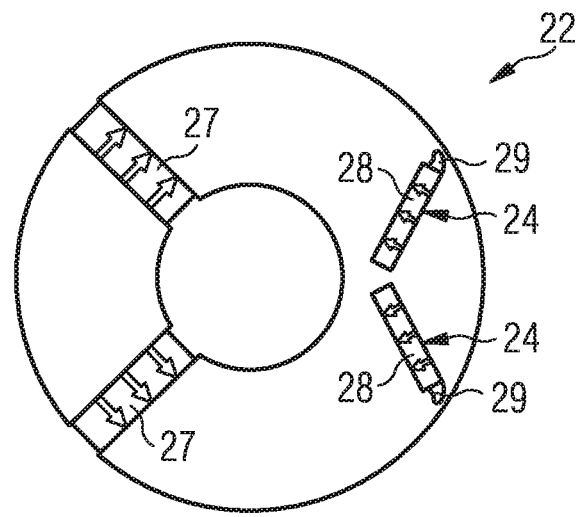
FIG. 3 shows a schematic cross-section through a rotor according to another embodiment.

FIG. 3 shows a cross-section through a rotor 22 according to another embodiment. The rotor 22 of FIG. 3 can be used in the electrical machine 20 shown in FIG. 1 instead of the rotor 22 shown in FIG. 1. The rotor 22 shown in FIG. 3 differs from the rotor 22 shown in FIG. 1 in that the rotor 22 comprises a total of two second recesses 24. A second permanent magnet 28 is arranged in each of the second recesses 24. The second recesses 24 are arranged entirely within the rotor 22.

The second permanent magnets 28 each have a rectangular shape in the cross-section through the rotor 22. The second permanent magnets 28 do not each completely fill the second recesses 24. An electrically insulating material 29 is arranged adjacent to the second permanent magnets 28 in each of the second recesses 24. The area in which the electrically insulating material 29 is arranged may be of any shape. In each case, the electrically insulating material 29 is arranged on the side of the second permanent magnet 28 which is arranged closest to the air gap 25.

The two second permanent magnets 28 are arranged in the rotor 22 in such a way that they approximately form a V together. The second recesses 24 are spaced apart from one another. The magnetic axes of the second permanent magnets 28 point in different directions. For each of the second permanent magnets 28, the magnetic axis extends in parallel relative to the shorter lateral edges of the second permanent magnet 28. Furthermore, the magnetic axes of the second permanent magnets 28 point approximately toward the first permanent magnets 27.

The rotor magnetic field excited by the first permanent magnets 27 and by the second permanent magnets 28 has four poles. The rotor 22 shown in FIG. 3 comprises exactly two first permanent magnets 27 and exactly two second permanent magnets 28.

Figure 4:
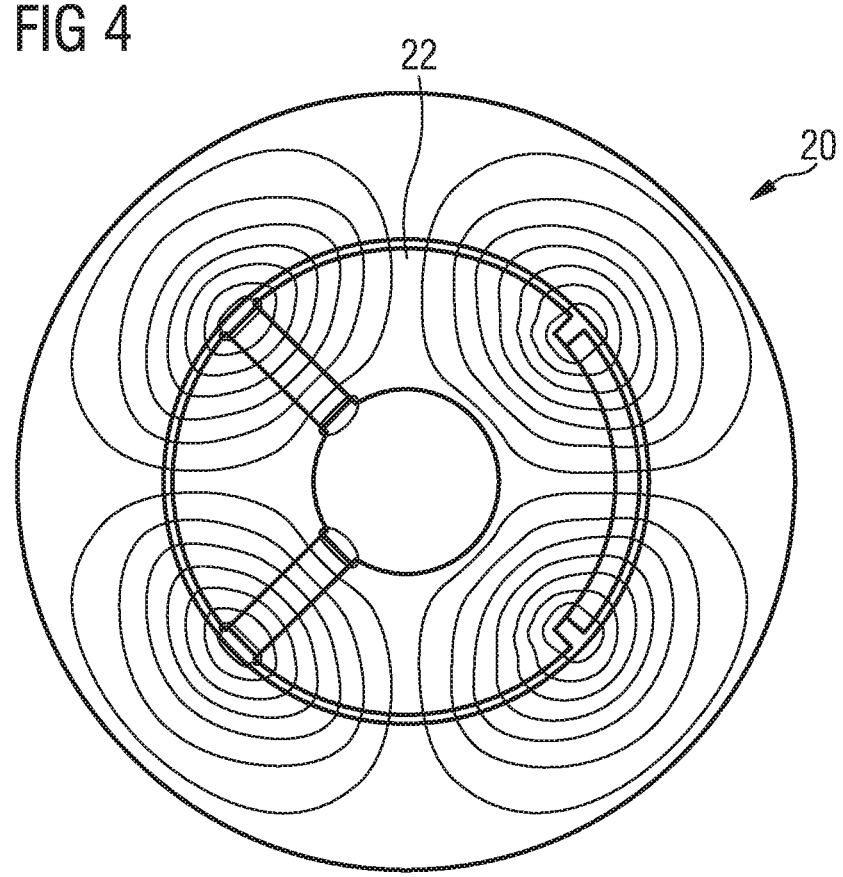
FIG. 4 shows the distribution of the simulated magnetic flux density in the electrical machine shown in FIG. 1.

FIG. 4 shows the distribution of the simulated magnetic flux density in the cross-section through the electrical machine 20 shown in FIG. 1. The rotor magnetic field 22 has four poles.

Figure 5:
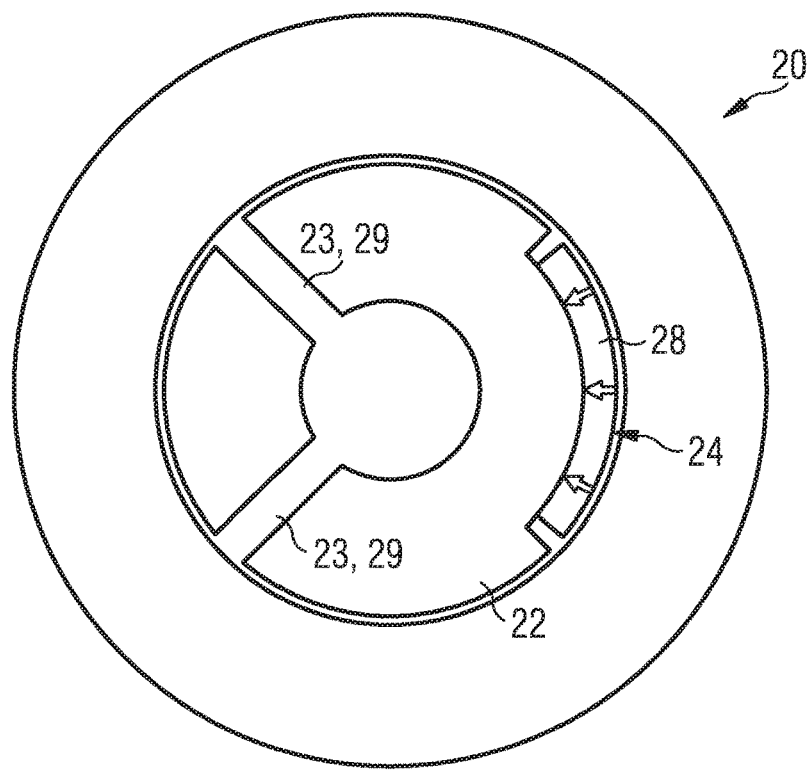
FIG. 5 shows a schematic cross-section through an electrical machine according to another embodiment.

FIG. 5 shows a schematic cross-section through an electrical machine 20 according to another embodiment. The electrical machine 20 has the same design as is shown in FIG. 1, the only difference being that no first permanent magnets 27 are arranged in the first recesses 23. Thus, the first recesses 23 are free of permanent magnets. Thus, the electrically insulating material 29 completely fills the first recesses 23. In this case, the electrically insulating material 29 is air. Thus, the first recesses 23 act as flux barriers in the rotor 22. The electrical machine 20 has exactly two first recesses 23 which are completely filled with air, and exactly one second recess 24 in which a second permanent magnet 28 is arranged. Operation of the electrical machine 20 shown in FIG. 5 is possible in the same way as with the electrical machine 20 shown in FIG. 1.

Figure 6:
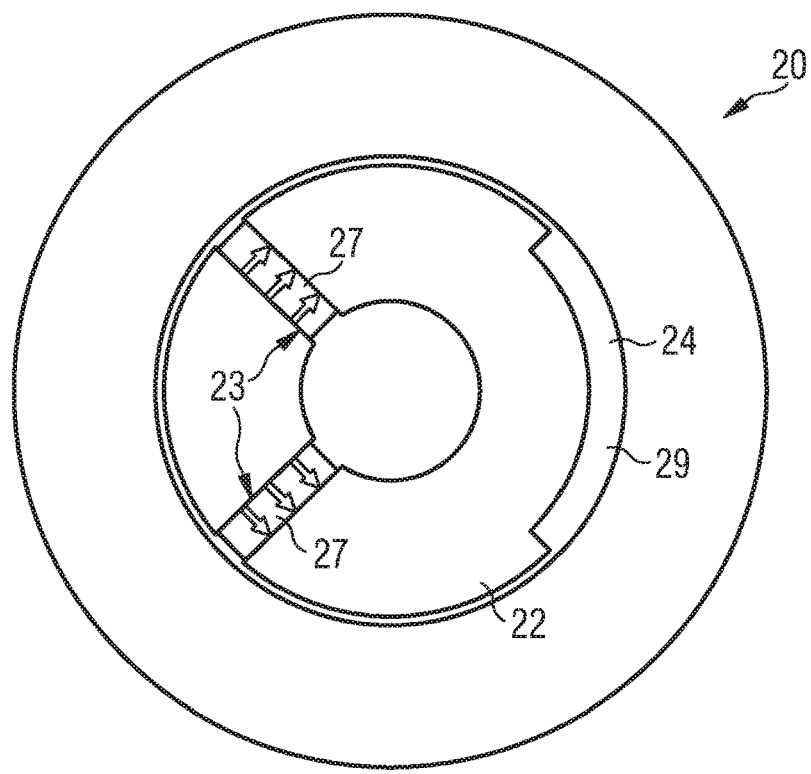
FIG. 6 shows a schematic cross-section through an electrical machine according to another embodiment.

FIG. 6 shows a schematic cross-section through an electrical machine 20 according to another embodiment. The electrical machine 20 has the same design as is shown in FIG. 1, the only difference being that no second permanent magnet 28 is arranged in the second recess 24. Thus, the second recess 24 is free of permanent magnets. Thus, the electrically insulating material 29 completely fills the second recess 24. In this case, the electrically insulating material 29 is air. Thus, the second recess 24 acts as a flux barrier in the rotor 22. The electrical machine 20 has exactly two first recesses 23, in each of which a first permanent magnet 27 is arranged, and exactly one second recess 24 which is completely filled with air. Operation of the electrical machine 20 shown in FIG. 6 is possible in the same way as with the electrical machine 20 shown in FIG. 1.

Figure 7:
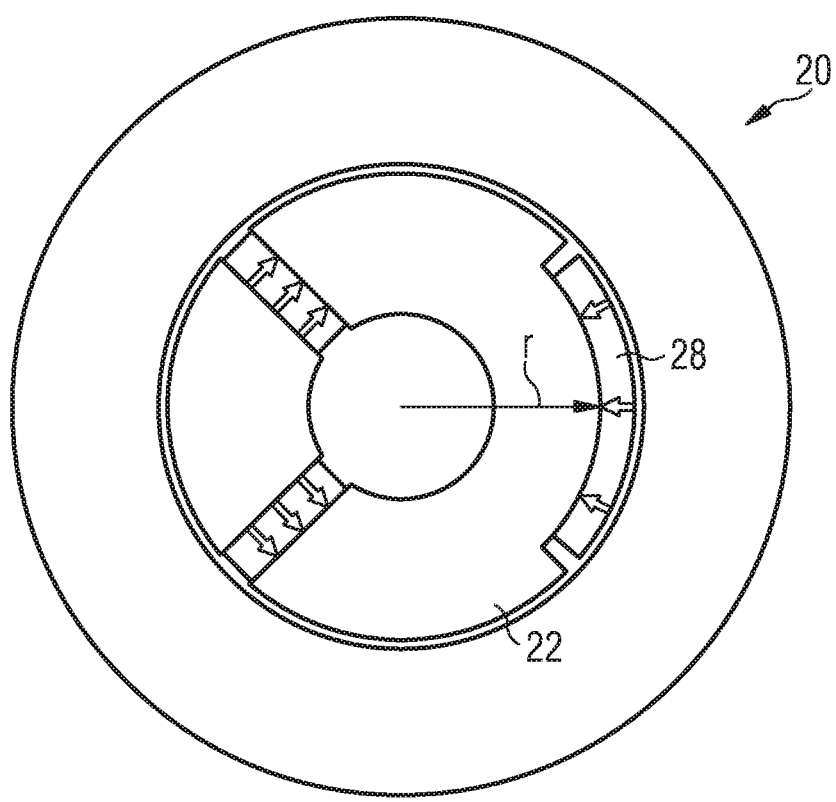
FIG. 7 shows a schematic cross-section through an electrical machine according to another embodiment.

FIG. 7 shows a schematic cross-section of an electrical machine 20 according to another embodiment. The electrical machine 20 has the same design as shown in FIG. 1, the only difference being that the magnetic axis of the second permanent magnet 28 extends differently than is shown in FIG. 1. In the rotor 22 in FIG. 7, the magnetic axis of the second permanent magnet 28 is in parallel to the radial direction r which passes through the center of the second permanent magnet 28. This means that, at any position of the second permanent magnet 28, the magnetic axis of the second permanent magnet 28 extends in parallel to the radial direction r which passes through the center of the second permanent magnet 28.

The invention claimed is:

1. An electrical machine comprising a stator and a rotor rotatably mounted relative to the stator, the rotor including:
two first recesses; and
at least one second recess,
wherein:
an air gap is arranged between the stator and the rotor,
the two first recesses are arranged in the rotor and extend completely through the rotor from the air gap to a shaft on which the rotor is arranged,
the two first recesses are arranged in a manner displaced relative to one another by less than 180° along the circumference of the rotor,
the at least one second recess is arranged in a manner displaced relative to the first recesses by more than 90° along the circumference of the rotor,
the at least one second recess does not extend through the rotor to the shaft, and
a first permanent magnet is arranged each in the first recesses and/or a second permanent magnet is arranged in the at least one second recess.

2. The electrical machine according to claim 1, wherein a rotor magnetic field, excited by the first and/or by the second permanent magnets, comprises four poles.

3. The electrical machine according to claim 1, wherein magnetic axes of the first permanent magnets point in opposite directions along the circumference of the rotor.

4. The electrical machine according to claim 1, wherein magnetic axes of the first permanent magnets are each perpendicular to a radial direction (r) in a cross-section through the rotor.

5. The electrical machine according to claim 1, wherein an electrically insulating material or a gas is arranged at least in some places in the first recesses.

6. The electrical machine according to claim 1, wherein the first recesses are each larger than the first permanent magnet arranged therein.

7. The electrical machine according to claim 1, wherein the at least one second recess is larger than the second permanent magnet.

8. The electrical machine according to claim 1, wherein an electrically insulating material or a gas is arranged at least in some places in the at least one second recess.

9. The electrical machine according to claim 1, wherein the second permanent magnet has a curved shape.

10. The electrical machine according to claim 1, wherein the at least one second recess is directly adjacent to the air gap.

11. The electrical machine according to claim 1, wherein the at least one second recess extends along a portion of the circumference of the rotor.

12. The electrical machine according to claim 1, wherein the at least one second recess has a main direction of extension which is perpendicular to a radial direction (r) in a cross-section through the rotor.

13. The electrical machine according to claim 1, wherein the electrical machine comprises two second recesses arranged entirely in the rotor.

14. A method of operating the electrical machine according to any of claims 1-13, wherein a component of a magnetomotive force of the rotor of an order greater than 1 is used for torque generation.

* * * * *